United States Patent
Lewis

(10) Patent No.: US 7,868,573 B2
(45) Date of Patent: Jan. 11, 2011

(54) DRIVE CIRCUITS

(75) Inventor: Eric Anthony Lewis, Rugby (GB)

(73) Assignee: Converteam UK Ltd, Warwickshire (GB)

( * ) Notice: Subject to any disclaimer, the term of this patent is extended or adjusted under 35 U.S.C. 154(b) by 523 days.

(21) Appl. No.: 11/652,221

(22) Filed: Jan. 11, 2007

(65) Prior Publication Data

US 2008/0116770 A1    May 22, 2008

(30) Foreign Application Priority Data

Jan. 14, 2006 (GB) ................................. 0600837.9

(51) Int. Cl.
*H02K 3/28* (2006.01)
*H02P 27/08* (2006.01)
(52) U.S. Cl. ...................................... 318/538; 318/558
(58) Field of Classification Search ................. 318/538, 318/558, 623, 629
See application file for complete search history.

(56) References Cited

U.S. PATENT DOCUMENTS

| | | | | |
|---|---|---|---|---|
| 6,392,905 | B1 * | 5/2002 | Huang et al. | 363/71 |
| 2003/0085627 | A1 * | 5/2003 | Lipo et al. | 310/12 |
| 2005/0099082 | A1 * | 5/2005 | Nashiki | 310/164 |
| 2006/0131888 | A1 * | 6/2006 | Ahmad et al. | 290/40 C |
| 2006/0197491 | A1 * | 9/2006 | Nojima | 318/801 |

FOREIGN PATENT DOCUMENTS

| | | |
|---|---|---|
| EP | 0 266 598 | 5/1988 |
| EP | 0266598 A2 | 5/1988 |
| GB | 1099622 | 1/1968 |
| GB | 1105540 | 3/1968 |
| JP | 53-135409 | 11/1978 |
| JP | 55-117445 | 9/1980 |
| JP | 2001 045795 | 2/2001 |
| RU | 2 159 982 C1 | 11/2000 |
| WO | WO 2004015851 A2 * | 2/2004 |

* cited by examiner

*Primary Examiner*—Bentsu Ro
(74) *Attorney, Agent, or Firm*—Kirschstein, et al.

(57) ABSTRACT

A drive circuit includes an ac network and first and second network rectifier/inverters (which can be active or passive) that are connected to the ac network in parallel. A first PWM rectifier/inverter is connected to the first network rectifier/inverter through a first dc link. A second PWM rectifier/inverter is connected to the second network rectifier/inverter through a second dc link. A first two-layer stator winding having a plurality of individual stator coils is connected to the first PWM rectifier/inverter and a second two-layer stator winding having a plurality of individual stator coils is connected to the second PWM rectifier/inverter. The stator coils of the first stator winding and the stator coils of the second stator winding are interconnected such that, in use, the vector sum of voltages across the stator coils in the first stator winding is substantially equal to the vector sum of voltages across the stator coils in the second stator winding. This has the advantageous effect of reducing the PWM frequency current harmonics flowing in the first and second stator windings.

14 Claims, 8 Drawing Sheets

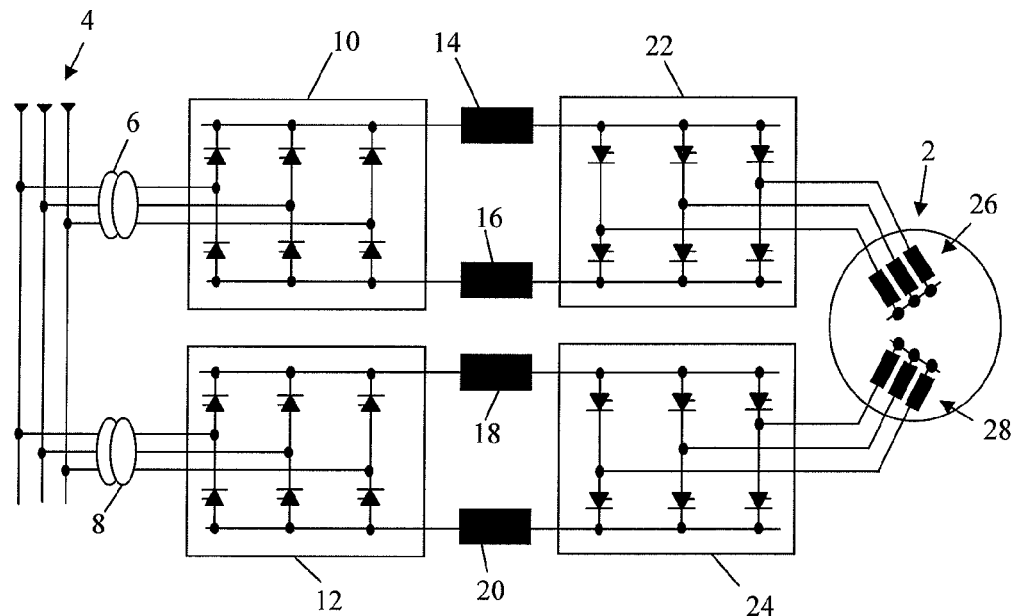
Figure 1    *PRIOR ART*
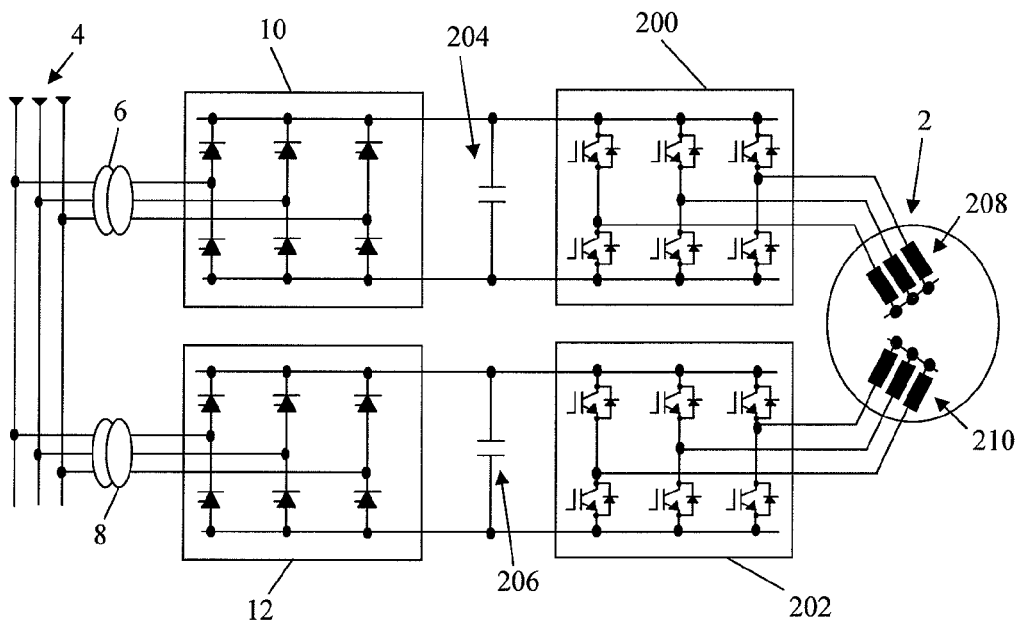
Figure 2    *PRIOR ART*

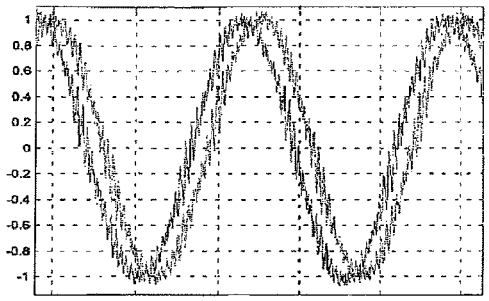
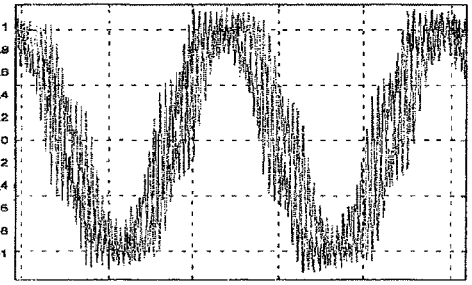
Figure 3a Figure 3b
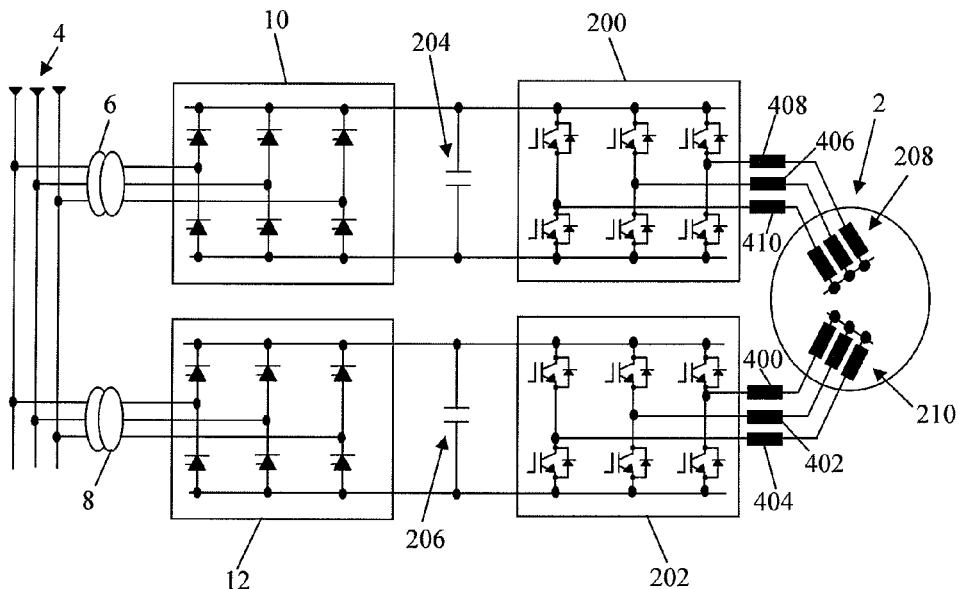
Figure 4 *PRIOR ART*

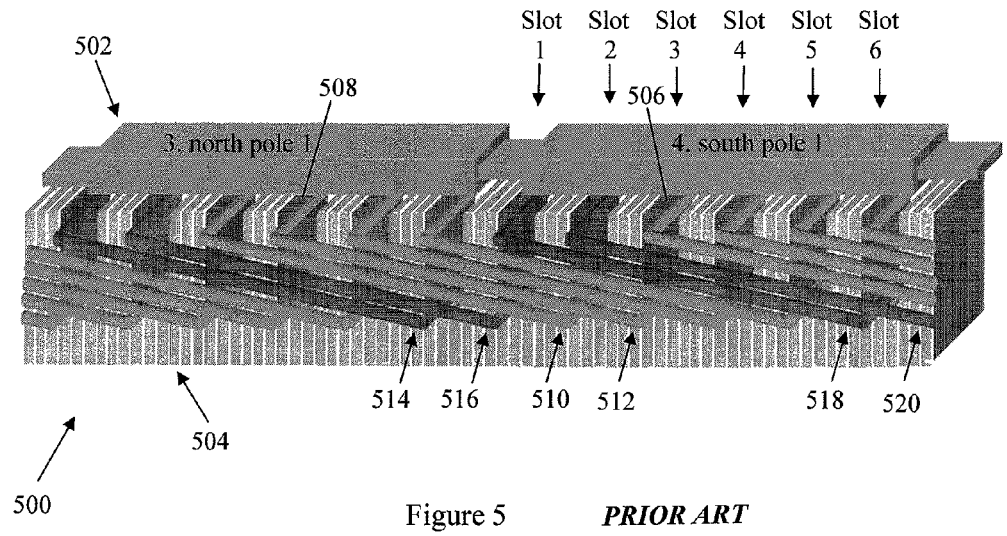
Figure 5  *PRIOR ART*
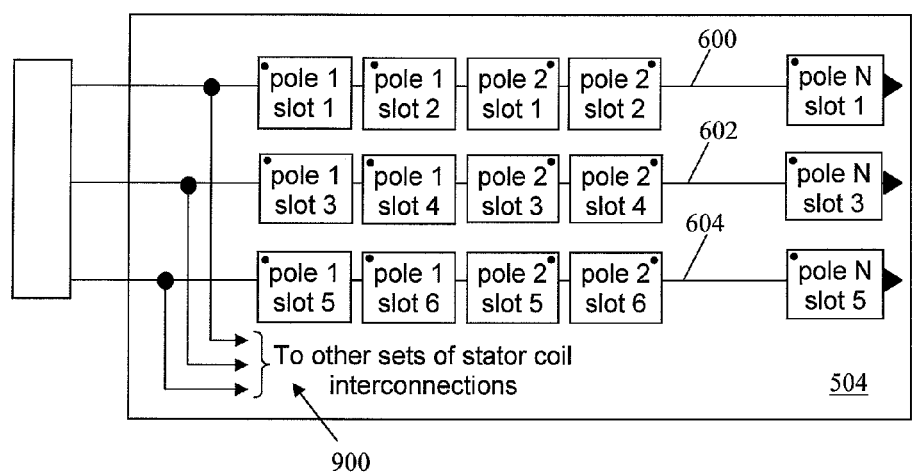
Figure 6  *PRIOR ART*

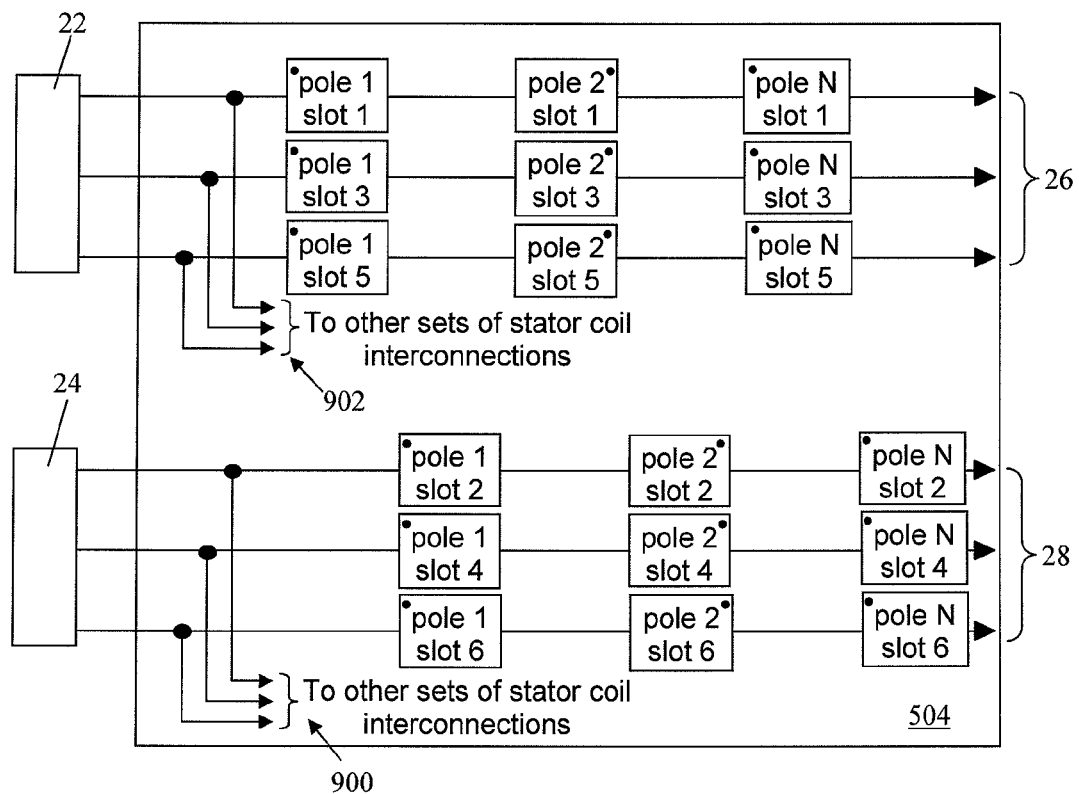
Figure 7  *PRIOR ART*

DRIVE CIRCUITS

FIELD OF THE INVENTION

The present invention relates to drive circuits, and in particular to drive circuits for multi-phase electrical machines that include pulse width modulation (PWM) power converters.

BACKGROUND OF THE INVENTION

Electrical machines have been developed over many decades and one particular example of such an electrical machine is the so-called dual stator winding LCI (load commutated inverter) machine, a schematic for which is shown in FIG. 1.

The electrical machine 2 of FIG. 1 is supplied with power from an ac supply 4 and a pair of transformers 6 and 8. Each of the transformers 6 and 8 is connected to a thyristor power converter, respectively shown as 10 and 12, arranged to convert the ac current of the transformers to a dc current. The dc current is then fed through connections having inductors 14, 16, 18 and 20 to thyristor power converters 22 and 24, which in turn are connected to the stator windings 26 and 28 of the electrical machine 2. It will be readily appreciated that it is desirable for the drive circuit to have two separate parallel drive paths connected between the ac supply 4 and the electrical machine 2 since this provides a way of reducing torque ripple in the output of the electrical machine 2. It also provides a certain degree of redundancy so that the system can continue to function if one of the drive paths fails. The stator windings 26 and 28 use a conventional construction shown in FIG. 5 that uses two stator coils per stator slot 506 and are therefore two-layer windings. Each stator coil has one end in the top of a stator slot and the other end in the bottom of a different stator slot. The stator coils of stator winding 26 must inherently be in different stator slots than the stator coils of stator winding 28. Virtually all electrical machines use this type of winding construction because each stator coil is identical and can easily be mass-produced by automated equipment at low cost.

The advantages provided by semiconductor switching devices such as field-effect transistors (FETs) and the like mean that the current trend in drive circuit design is to use pulse width modulation (PWM) power converters instead of the thyristor power converters 22 and 24 shown in FIG. 1. An equivalent arrangement to that shown in FIG. 1, but using PWM power converters 200 and 202, is shown in FIG. 2. In addition to replacing the thyristor power converters 22 and 24, the inductors 14, 16, 18 and 20 have been replaced by dc links 204 and 206 to allow the current to fluctuate as required by the PWM waveforms. It has been found that trying to drive an electrical machine 2 with the circuit shown in FIG. 2 does not work as would perhaps be expected due to the unexpectedly high magnitude of the PWM frequency current harmonics in the currents flowing in the stator windings 208 and 210. FIG. 3a shows an example of the current flows that would perhaps be predicted. This must be contrasted with the actual recorded current flows shown in FIG. 3b. The expectedly high magnitude of the PWM frequency current harmonics is undesirable; they cause significant extra machine losses, significant extra machine heating, a reduction in the rating of the machine, increased machine mechanical vibrations and increased audible acoustic noise emissions.

It will be seen that the actual current flows shown in FIG. 3b include a high degree of PWM frequency current harmonics when compared to the predicted current flows shown in FIG. 3a. This degree of PWM frequency current harmonics arises from the physical proximity of the stator coils within each of the stator windings.

In order to overcome this problem, the drive circuit for the electrical machine 2 can be modified as shown in FIG. 4 to include inductors 400, 402, 404, 406, 408 and 410 between the PWM power converters 200 and 202 and the electrical machine 2. The use of inductors 400 to 410 significantly reduces the PWM frequency current harmonics in the stator windings 208 and 210 to allow the electrical machine 2 to be operated as predicted. However, at the power levels required for some applications (propelling a ship, train or the like, or for power generation etc.) the cost of the inductors 400 to 410 can be high and they are likely to require substantial space to house them.

A different way of overcoming this problem is to have the stator coils of both stator windings 208 and 210 located in the same stator slots. However, this would require a non-conventional construction using four stator coils per slot. In other words, the stator winding 208 and 210 would have to be four-layer windings. These are significantly more difficult, complex and expensive to produce.

It is therefore desirable to be able to produce electrical machines with low PWM frequency current waveforms (i.e. having the predicted current flows shown in FIG. 3a) that can use the drive circuit of FIG. 2 and where the stator windings 208 and 210 are conventional two-layer windings.

SUMMARY OF THE INVENTION

The present invention provides a drive circuit for an electrical machine having a stator, the drive circuit comprising:
an ac network;
first and second network rectifier/inverters connected to the ac network in parallel;
a first PWM rectifier/inverter connected to the first network rectifier/inverter through a first dc link;
a second PWM rectifier/inverter connected to the second network rectifier/inverter through a second dc link;
a first two-layer stator winding having a plurality of stator coils connected to the first PWM rectifier/inverter; and
a second two-layer stator winding having a plurality of stator coils connected to the second PWM rectifier/inverter;
wherein the stator coils of the first stator winding and the stator coils of the second stator winding are interconnected such that, in use, the vector sum of voltages across the stator coils in the first stator winding is substantially equal to the vector sum of voltages across the stator coils in the second stator winding so as to reduce the PWM frequency current harmonics flowing in the first and second stator windings.

When the vector sum of the voltages across the stator coils of the first and second stator windings are equal and in phase then the first and second PWM rectifier/inverters will have essentially the same output voltages and essentially the same output PWM voltage waveforms. This then acts to reduce or even eliminate the effects of the mutual coupling of the first and second stator windings and hence reduce or even eliminate the PWM frequency current harmonics flowing in the first and second stator windings. This interconnection is possible because, with the use of PWM technology, it is no longer necessary to provide a phase shift between the first and second stator windings to reduce torque ripple in the output of the electrical machine.

One of the main advantages of interconnecting the stator coils of the first and second two-layer stator windings to reduce the PWM frequency current harmonics is that the inductors shown in FIG. 4 are no longer required. This simplifies the structure of the drive circuit and leads to significant reductions in cost and physical size. It will be readily appreciated that the stator coils can be interconnected using any suitable arrangement that results in the vector sum of voltages across the stator coils in the first and second stator windings being substantially equal, but specific examples are set out in more detail below.

Another advantage of the present invention is that it retains the low cost traditional two-layer stator winding construction.

It will be readily appreciated that the first and second network rectifier/inverters (i.e. the first and second rectifier/inverters connected between the ac network and the dc links) can have a wide variety of different configurations. For example, the first and second network rectifier/inverters can use diodes for rectification only to supply power to the dc links without controlling the dc link voltages. If thyristors are used in place of diodes then the dc link voltages can be controlled. Placing thyristors in anti-parallel enables the first and second network rectifier/inverters to operate in both a rectifying and an inverting mode. In this case, the first and second network rectifier/inverters can be used to supply power to the dc links or export power from the dc links and also control the dc link voltages. The first and second network rectifier/inverters may also be PWM rectifier/inverters as defined below.

The term "PWM rectifier/inverter" is used herein to refer to any power converter including a plurality of semiconductor power switching devices that are controlled using gate drive control signals derived in accordance with a conventional pulse width modulation (PWM) strategy. An example might be an MV3000 power converter, which is a two-level PWM inverter that uses diodes for the network rectifier/inverter stage and insulated gate bipolar transistors (IGBTs) for the PWM rectifier/inverter stage. Another example might be an MV7000 power converter, which is a three-level AFE-PWM inverter that uses insulated emitter enhanced gate bipolar transistors (IEGTs) for both the network rectifier/inverter and PWM rectifier/inverter stages. Both products are supplied by Converteam Ltd of Boughton Road, Rugby, Warwickshire, CV21 BU, United Kingdom.

In the case where the electrical machine has a minimum configuration of 6 slots per pole and no parallel paths then the stator coils of the first stator winding may be interconnected according to the following formula:

stator coil in (pole N, slot X) is connected to the stator coils in (pole S, slot (X+1)), where N is the number of any north pole, where S is the number of the next south pole after pole N in the connection sequence, and where X is the connection sequence number of the first stator coil within a given set within the north pole. X may have a value of 1, 3 or 5.

The stator coils of the second stator winding may be interconnected according to the following formula:

stator coil in (pole N, slot Y) is connected to the stator coils in (pole S, slot (Y−1)), where N is the number of any north pole, where S is the number of the next south pole after pole N in the connection sequence, and where Y is the connection sequence number of the first stator coil within a given set within the north pole. Y may have a value of 2, 4 or 6.

N may be any odd integer number and S may be any even integer number depending on the specific arrangement of the electrical machine and its desired properties.

A similar set of equations may be applied if the north and south poles of the electrical machine have a reversed order.

For example, the stator coils for a two-pole electrical machine with 6 slots per pole may be connected as follows:

First stator winding: stator coil in north pole, slot 1 is connected to stator coil in south pole, slot 2;

First stator winding: stator coil in north pole, slot 3 is connected to stator coil in south pole, slot 4;

First stator winding: stator coil in north pole, slot 5 is connected to stator coil in south pole, slot 6;

Second stator winding: stator coil in north pole, slot 2 is connected to stator coil in south pole, slot 1;

Second stator winding: stator coil in north pole, slot 4 is connected to stator coil in south pole, slot 3; and Second stator winding: stator coil in north pole, slot 6 is connected to stator coil in south pole, slot 4.

It will be readily appreciated that the above example can be easily extended to electrical machines with more than two poles, with north and south poles connected in reverse order, with stator windings connected in reverse order, or with sets of series and/or parallel connections.

In the case where the electrical machine has more than 6 stator coils per pole, then the stator coils of the first stator winding may be interconnected according to the following formula:

stator coil in (pole N, slot X) is connected to stator coils in series up to (pole N, slot (X+Q−1)) that is then connected to the stator coils in (pole S, slot (X+Q)), this stator coil is then connected to stator coils in series up to (pole S, slot (X+2Q−1)), where N is the number of any north pole, where S is the number of the next south pole after pole N in the connection sequence of the same parallel path, where Q is the number of stator slots used per pole per phase, and where X is the connection sequence number of the first stator coil within a given set within the north pole. X may have integer values of 1, 2Q+1 or 4Q+1.

The stator coils of the second stator winding may be interconnected according to the following formula:

stator coil in (pole N, slot Y) is connected to stator coils in series up to (pole N, slot (Y+Q−1)) that is then connected to the stator coils in (pole S, slot (Y−Q)), this stator coil is then connected to stator coils in series up to (pole S, slot (Y−1)), where N is the number of any north pole, where S is the number of the next south pole after pole N in the connection sequence of the same parallel path, where Q is the number of stator slots used per pole per phase, and where Y is the connection sequence number of the first stator coil within a given set within the north pole. Y may have integer values of Q+1, 3Q+1 or 5Q+1.

N may be any odd integer number, S may be any even integer number, and Q may be any integer number depending on the specific arrangement of the electrical machine and its desired properties.

For example, the stator coils for a two-pole electrical machine with 12 slots per pole may be connected as follows:

First stator winding: stator coil in north pole, slot 1 is connected to stator coil in north pole, slot 2;

First stator winding: stator coil in north pole, slot 2 is connected to stator coil in south pole, slot 3;

First stator winding: stator coil in south pole, slot 3 is connected to stator coil in south pole, slot 4;

First stator winding: stator coil in north pole, slot 5 is connected to stator coil in north pole, slot 6;

First stator winding: stator coil in north pole, slot 6 is connected to stator coil in south pole, slot 7;

First stator winding: stator coil in south pole, slot 7 is connected to stator coil in south pole, slot 8;

First stator winding: stator coil in north pole, slot 9 is connected to stator coil in north pole, slot 10;

First stator winding: stator coil in north pole, slot 10 is connected to stator coil in south pole, slot 11;

First stator winding: stator coil in south pole, slot 11 is connected to stator coil in south pole, slot 12;

Second stator winding: stator coil in north pole, slot 3 is connected to stator coil in north pole, slot 4;

Second stator winding: stator coil in north pole, slot 4 is connected to stator coil in south pole, slot 1;

Second stator winding: stator coil in south pole, slot 1 is connected to stator coil in south pole, slot 2;

Second stator winding: stator coil in north pole, slot 7 is connected to stator coil in north pole, slot 8;

Second stator winding: stator coil in north pole, slot 8 is connected to stator coil in south pole, slot 5;

Second stator winding: stator coil in south pole, slot 5 is connected to stator coil in south pole, slot 6;

Second stator winding: stator coil in north pole, slot 11 is connected to stator coil in north pole, slot 12;

Second stator winding: stator coil in north pole, slot 12 is connected to stator coil in south pole, slot 9; and Second stator winding: stator coil in south pole, slot 9 is connected to stator coil in south pole, slot 10.

It will be readily appreciated that the above example can be easily extended to electrical machines with more than two poles, with north and south poles connected in reverse order, with stator windings connected in reverse order, or with sets of series and/or parallel connections.

The present invention further provides an electrical machine incorporating the drive circuit described above. The electrical machine may function as a motor (in which case the ac network acts as an ac supply, the first and second network rectifier/inverters act as rectifiers to supply dc current to the dc links and the first and second PWM rectifier/inverters act as inverters to supply ac current to the first and second stator windings, respectively) or as a generator (in which case the first and second PWM rectifier/inverters act as rectifiers to supply dc current to the dc links and the first and second network rectifier/inverters act as inverters to supply ac current to the ac network).

The drive circuit can be used by an electrical machine having any number of phases (each phase having two or more two-layer stator windings), any number of poles and with any number of slots per pole that permit the winding connections described above to be implemented.

BRIEF DESCRIPTION OF THE DRAWINGS

Exemplary embodiments of the invention will now be described, with reference to the accompanying drawings, in which:

FIG. 1 is a schematic diagram of a first prior art drive circuit for a dual stator winding LCI electrical machine, wherein the drive circuit includes thyristor power converters;

FIG. 2 is a schematic diagram of a second prior art drive circuit for a dual stator winding electrical machine, where the drive circuit includes thyristor power converters and PWM power converters;

FIGS. 3*a* and 3*b* show current waveforms for the electrical machine of FIG. 2;

FIG. 4 is a schematic diagram of a third prior art drive circuit for a dual stator winding electrical machine, where the drive circuit includes inductors between the PWM power converters and the stator windings of the electrical machine to reduce PWM frequency current harmonics;

FIG. 5 is a schematic diagram for the purpose of explaining the terminology used to describe the stator windings of an electrical machine;

FIG. 6 is a schematic diagram showing how the stator winding of FIG. 5 can be interconnected for an electrical machine with one stator winding comprising three phases;

FIG. 7 is a schematic diagram showing how the two stator windings are interconnected for the first prior art drive circuit of FIG. 1;

DETAILED DESCRIPTION OF THE PREFERRED EMBODIMENTS

Figure 8:
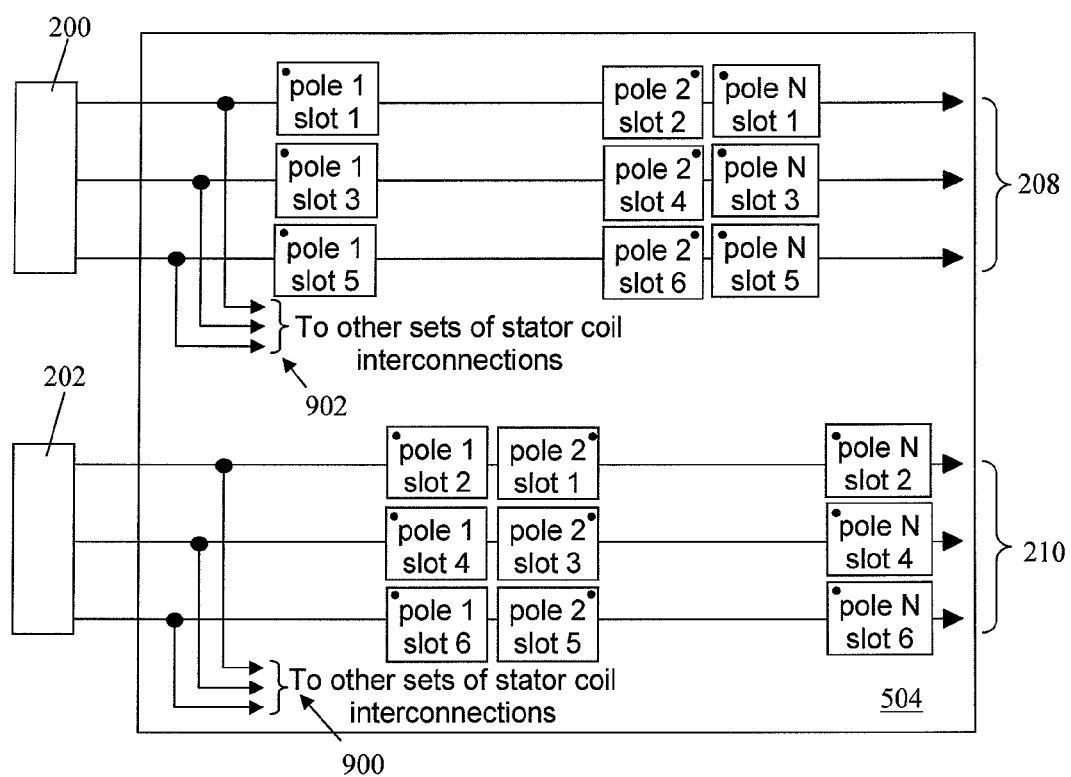
FIG. 8 is a schematic diagram showing first interconnected stator windings used in a drive circuit of the present invention.

FIG. 5 shows a typical arrangement for the stator winding of an electrical machine 500 having a rotor 502 and a stator 504 (only portions of which are shown). The stator 504 has a series of slots 506 and 508 for receiving the stator coils 510 and 512 of a stator winding. A typical stator coil (for example the stator coil 512) spans several slots. More particularly, stator coil 512 starts in slot 506 and finishes in slot 508 crossing four slots in between. A stator coil also typically has one end in a bottom region of a slot (slot 506 as shown) and the other end in a top region of a slot (slot 508 as shown).

A common arrangement is for two stator coils to be fitted in each slot. Such an arrangement is commonly referred to as a two-layer stator winding since there are two stator coils within each slot.

As shown in FIG. 5, each of the poles of the rotor covers six slots in the stator 504 and such an arrangement is commonly referred to as a six slot per pole stator. In other embodiments there may be any other number of slots per pole.

In a three-phase electrical machine there are typically 3N slots per pole, where N is an integer. In more general terms, the number of slots per pole is usually an integer number of multiples of the number of phases of the electrical machine.

FIG. 5 also illustrates the generally accepted convention for naming or identifying the stator coils of a stator winding. The stator winding shown in FIG. 5 is a three-phase stator winding and has two stator coils per slot per phase (i.e. the stator 504 of the electrical machine is a six slot per pole stator as discussed above). Looking at the first phase stator coils (shown in a darker colour in FIG. 5) then the first phase stator coil 514 is referred to as the stator coil in pole 1, slot 1. The first phase stator coil 516 is referred to as the stator coil in pole 1, slot 2. The first phase stator coil 518 is referred to as the stator coil in pole 2, slot 1. The first phase stator coil 520 is referred to as the stator coil in pole 2, slot 2. The stator windings for the second and third phases (shown in a lighter colour in FIG. 5) have a similar set of stator coils.

It will be readily appreciated that the individual stator coils may be connected in a variety of different ways; series, parallel or a combination of series and parallel. Each connection arrangement provides the electrical machine with known current and voltage carrying capacities and hence performance characteristics. Therefore, the interconnection of the stator coils of each stator winding is selected to give the electrical machine the desired properties.

A typical interconnection of stator coils is shown schematically in FIG. 6. It will be seen that in this particular arrangement the stator coils of each phase are connected together in series. In other words, the stator windings 600, 602 and 604 associated with each phase of the electrical machine each contain a plurality of stator coils in series with each other. If any stator coils were to be connected together in parallel then they could be connected with the connections 900 and 902 shown in FIGS. 6, 7 and 8.

The stator winding 600 represents the stator winding for the first phase and includes the stator coils in pole 1, slot 1 (i.e. stator coil 514); pole 1, slot 2 (i.e. stator coil 516); pole 2, slot 1 (i.e. stator coil 518); and pole 2, slot 2 (i.e. stator coil 520). This repeats for N stator coils in a similar sequence. The stator winding 602 represents the stator winding for the second phase and includes the stator coils in pole 1, slot 3 (i.e. stator coil 510); pole 1, slot 4 (i.e. stator coil 512); pole 2, slot 3; and pole 2, slot 4. This repeats for N stator coils in a similar sequence. The stator winding 604 represents the stator winding for the third phase and includes the stator coils in pole 1, slot 5; pole 1, slot 6; pole 2, slot 5; and pole 2, slot 6. This repeats for N stator coils in a similar sequence.

For the electrical machine 500 to function properly, the stator coils for a pair of north and south poles are connected such that the induced voltages therein add; it will be readily appreciated that the induced voltages will be opposite in nature. In FIG. 6, the position of the dots next to each of the stator coils reflect this connection with the reversal of connection for the north and south poles.

The electrical machine of FIG. 1 is a dual stator winding LCI (load commutated inverter) machine having first and second stator windings 26 and 28. Such an electrical machine has two separate stator windings and the interconnection of the stator coils in each stator winding is shown schematically in FIG. 7. The stator coils of the first stator winding 26 are physically displaced from the stator coils of the second stator winding 28 and this helps to make sure that the forces generated by the stator on the rotor are evenly distributed around the circumference of the stator.

For any electrical machine it is normal to define an electrical angle, in the stator and the rotor, of a pair of north and south poles, as being equal to 360 electrical degrees. This is not the same as the physical angle occupied by the same pair of north and south poles which will depend upon the number of poles of the stator.

As an example of stator design, there may be 12 stator coils in each stator winding. For a pair of north and south poles, the electrical angle between adjacent stator coils is called the difference angle, which in this example is equal to 360/12=30 electrical degrees. In order that such a stator (i.e. having stator windings as shown in FIG. 7) operates correctly, the voltages and current in the thyristor power converter 22 should be offset by the same difference angle as the voltage and currents in the thyristor power converter 24. The use of this difference angle can provide additional benefit by helping to cancel torque harmonics in the stator windings.

The alternative drive circuit shown in FIG. 2 (i.e. where the thyristor power converters 22 and 24 are replaced by the pulse width modulated (PWM) power converters 200 and 202) suffers from significant PWM frequency current harmonics due to the proximity of the stator coils within the first and second stator windings 208 and 210. For example, it may be the case that the stator coil in pole 1, slot 1 of the first stator winding 208 is in physical proximity to the stator coil in pole 1, slot 2 of the second stator winding 210. This would mean that there is a high degree of mutual coupling between these two stator coils and a transformer action may occur with a current being induced in one of the stator coils when a current flow through the other. It is this mutual coupling between the stator coils of the first and second stator windings 208 and 210 that leads to the significant PWM frequency current harmonics.

One solution to the problem of PWM frequency current harmonics is shown in FIG. 4 and discussed above. However, an alternative solution based on the interconnection of the individual stator coils of the first and second stator windings 208 and 210 of the drive circuit of FIG. 2 will now be explained with reference to FIGS. 8 to 10.

FIG. 8 shows how the stator coils in the first and second stator windings 208 and 210 can be interconnected and used in a drive circuit of the present invention. It will be seen that the interconnection of the stator coils of the first and second stator windings 208 and 210 is different to that shown in FIG. 7 and it is important to note that the pattern of interconnection of the stator coils of the first stator winding 208 is different to the pattern of interconnection of the stator coils of the second stator winding 210.

The interconnection of the stator coils of the first stator winding 208 may be summarised by the following formula that applies for an electrical machine with the minimum configuration of 6 slots per pole and without any parallel paths:

stator coil in (pole N, slot X) is connected to the stator coils in (pole S, slot (X+1)), where:

N is the number of any north pole, and can be any odd integer number,

S is the number of the next south pole after pole N in the connection sequence, and will be an even integer number, and X is the connection sequence number of the first stator coil within a given set within the north pole, and can have integer values of 1, 3 and 5.

The interconnection of the stator coils of the second stator winding 210 may be summarised by the following formula that applies for an electrical machine with the minimum configuration of 6 slots per pole and without any parallel paths:

stator coil in (pole N, slot Y) is connected to the stator coils in (pole S, slot (Y−1)), where:

Y is the connection sequence number of the first stator coil within a given set within the north pole, and can have integer values of 2, 4 and 6.

In the case of both stator winding interconnections, the numbering allows for the coil reverse connection in the north poles versus the south poles. A similar set of equations would apply if the north and south poles have a reversed order.

Figure 10:
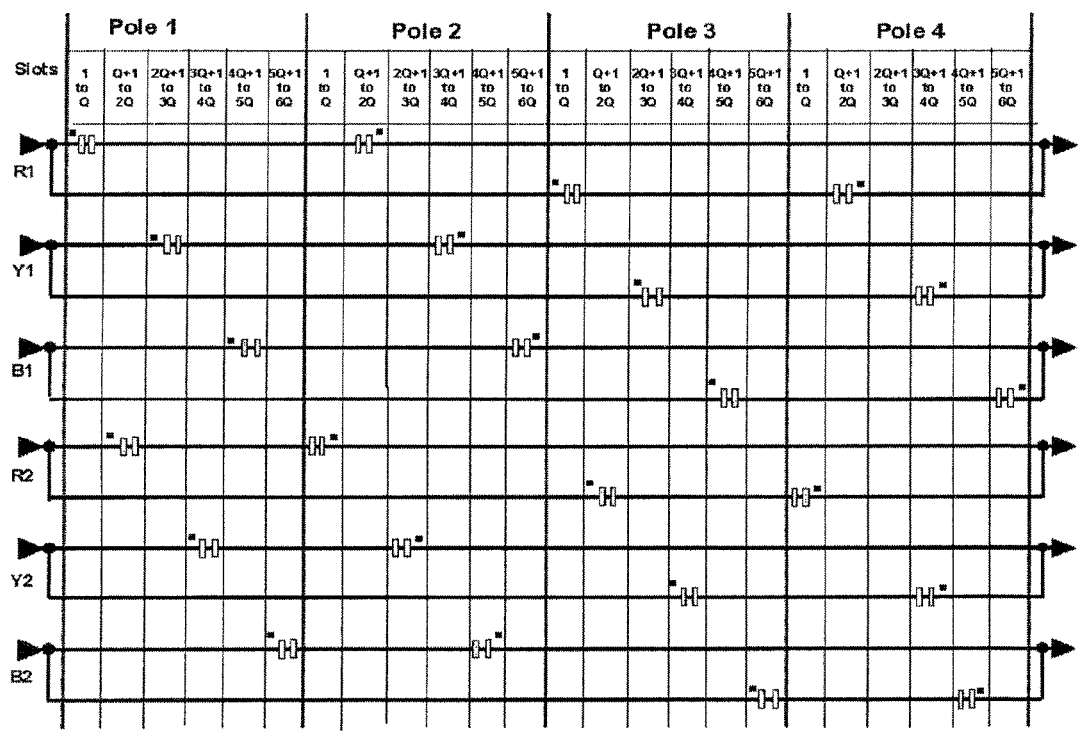
FIG. 10 is a schematic diagram showing second interconnected stator windings used in a drive circuit of the present invention where the electrical machine has four poles and Q=2 slots per pole per phase plus two parallel paths.

When the electrical machine has more than 6 slots per pole and/or parallel paths of stator coils are used then a wide range of interconnection patterns are possible. An example of a possible interconnection pattern is shown in FIG. 10 for an electrical machine having 4 poles, Q slots per pole per phase and two parallel paths. This gives a total of 6Q slots per pole.

For the interconnection pattern of FIG. 10 with Q=2 or for interconnection patterns with other values of Q, the interconnection of the stator coils in the first stator winding 208 may be summarised by the following formula:

stator coil in (pole N, slot X) is connected to stator coils in series up to (pole N, slot (X+Q−1)) that is then connected to the stator coils in (pole S, slot (X+Q)), this coil is then connected to stator coils in series up to (pole S, slot (X+2Q−1)), where:

N is the number of any north pole, and can be any odd integer number,

S is the number of the next south pole after pole N in the connection sequence of the same parallel path, and will be an even integer number, Q is the number of stator slots used per pole per phase, and will be any integer, and X is the connection sequence number of the first stator coil within a given set within the north pole, and can have integer values of 1, 2Q+1 and 4Q+1.

The interconnection of the stator coils in the second stator winding 210 may be summarised by the following formula:
stator coil in (pole N, slot Y) is connected to stator coils in series up to (pole N, slot (Y+Q−1)) that is then connected to the stator coils in (pole S, slot (Y−Q)), this coil is then connected to stator coils in series up to (pole S, slot (Y−1)), where:

Y is the connection sequence number of the first stator coil within a given set within the north pole, and can have integer values of Q+1, 3Q+1 and 5Q+1.

In the case of both stator winding interconnections, the numbering allows for the coil reverse connection in the north poles versus the south poles. A similar set of equations would apply if the north and south poles have a reversed order.

An advantage of interconnecting the stator coils of the first and second stator windings 208 and 210 in this manner is that the voltages flowing in neighbouring stator coils around the stator are caused to be substantially the same at any point in time. This means that there is no voltage difference between the stator coils of the first and second stator windings that are in physical proximity to one another and no transformer action occurs. No currents are induced and the PWM frequency current harmonics are correspondingly reduced.

This removes the need for the inductors 400 to 410 of FIG. 4 which simplifies the overall drive circuit and retains the use of a two-layer winding.

The advantage of the drive circuit of the present invention over the drive circuit of FIG. 4 can be further explained by considering the vector sum of voltages flowing in the stator coils of the first and second stator windings 208 and 210.

The voltage vectors shown in FIG. 9a for the first and second stator windings 208 and 210 are summarized in the following table:

| Vector position (electrical degrees) | Stator coil |
|---|---|
| 0 | First stator winding 208 (pole 1, slot 1) |
| 30 | Second stator winding 210 (pole 1, slot 2) |
| 60 | First stator winding 208 (pole 1, slot 3) |
| 90 | Second stator winding 210 (pole 1, slot 4) |
| 120 | First stator winding 208 (pole 1, slot 5) |
| 150 | Second stator winding 210 (pole 1, slot 6) |
| 180 | Second stator winding 210 (pole 2, slot 1) |
| 210 | First stator winding 208 (pole 2, slot 2) |

-continued

| Vector position (electrical degrees) | Stator coil |
|---|---|
| 240 | Second stator winding 210 (pole 2, slot 3) |
| 270 | First stator winding 208 (pole 2, slot 4) |
| 300 | Second stator winding 210 (pole 2, slot 5) |
| 330 | First stator winding 208 (pole 2, slot 6) |

Figure 9A:
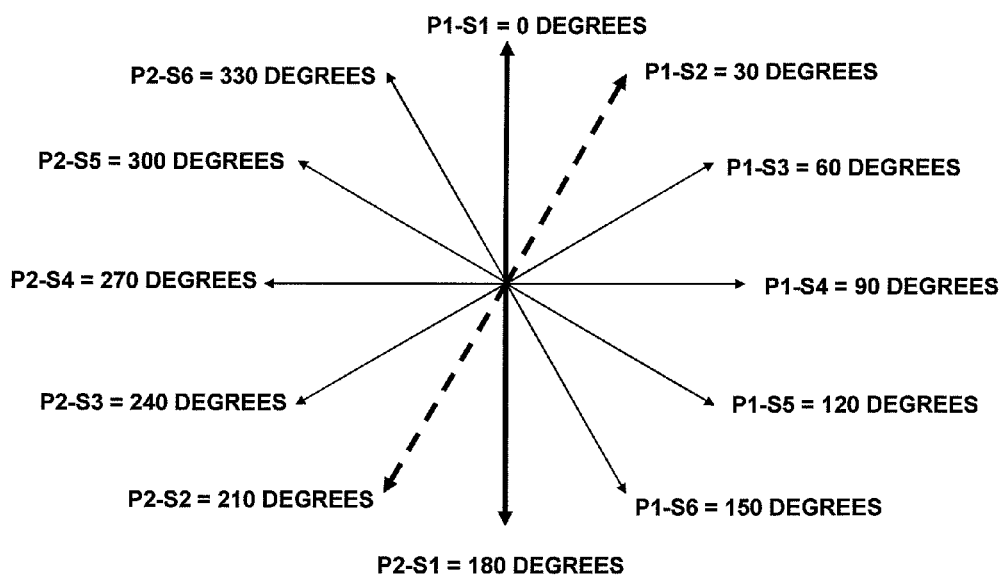
FIGS. 9*a* and 9*b* show the resultant voltage vectors for current flowing through the interconnected stator winding of FIG. 8.
Figure 9B:
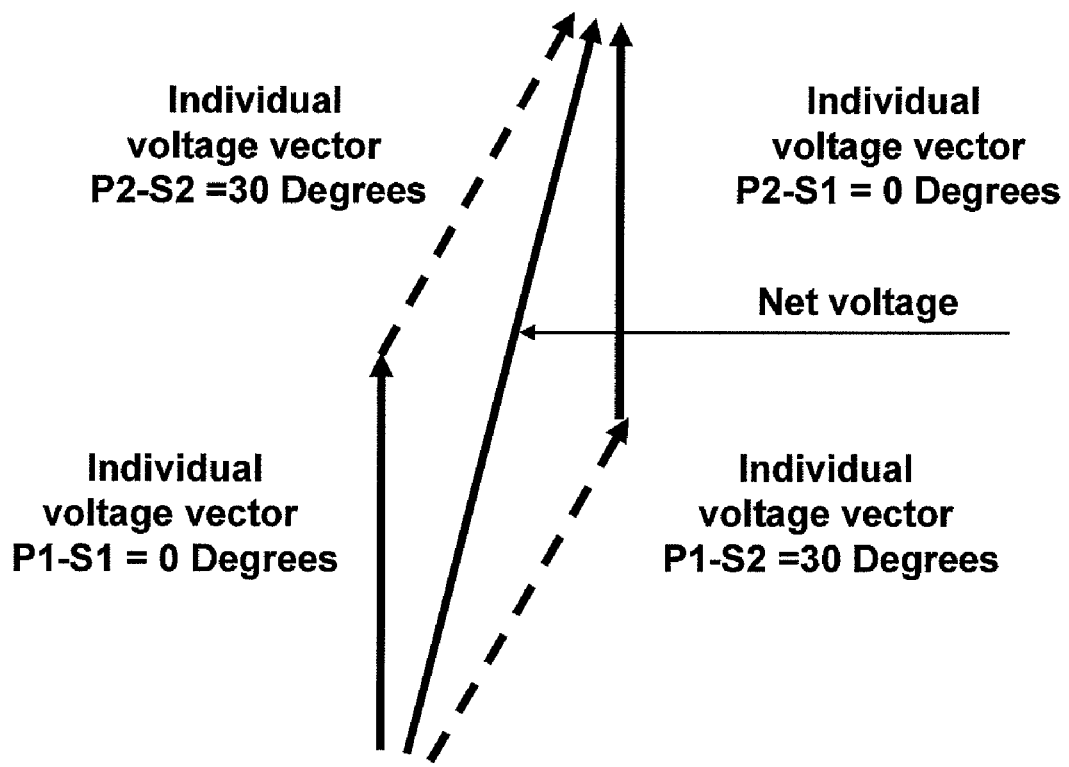

Referring to FIG. 9b, it can be seen that the vector sum of the voltages across the stator coil in pole 1, slot 2 and the stator coil in pole 2, slot 2 of the first stator winding 208 is the same as the vector sum of the voltages across the stator coil in pole 1, slot 2 and the stator coil in pole 2, slot 1 of the second stator winding 210.

It will be readily appreciated from the position of the dots in FIG. 8 that some of the stator coils have had their polarity reversed and this is reflected in the way in which they are connected to give the vector sum of FIG. 9a. The vector sum of the voltages across the stator coils of the first stator winding 208 is substantially equal to the vector sum of the voltages across the stator coils of each of the other stator windings. This allows the three phase voltages and currents to be in time phase.

The slots referred to in FIG. 9a are in physical proximity to one another such that if the voltages across the stator coils were different then currents would be induced and PWM frequency current harmonic problems would result. However, it will be seen from the vector sum of FIG. 9a that the voltages across these stator coils are substantially the same and no transformer action occurs.

FIG. 9b shows how the vector sum of the voltages across the stator coils in the first stator windings of each phase would have equal vector sums to the voltages across the stator coils in the second stator winding of each phase. In other words, for a three-phase electrical machine (where each phase may be referred to as "red", "yellow" and "blue") then the balance of voltages would exist for the first and second stator windings of the "red" phase, the first and second stator windings of the "yellow" phase and the first and second stator windings of the "blue" phase.

The interconnection of the stator coils may be applied to any number of phases and to situations where each phase includes more than two stator windings. In the case where the stator has more than two stator windings then the stator coils would be interconnected in such a way that the vector sums of the voltages across the stator coils within each of the stator windings are substantially equal.

What is claimed is:

1. An electrical machine having a stator with a plurality of slots and a drive circuit for interfacing the electrical machine to an alternating current (ac) network, the drive circuit comprising:
   first and second network rectifiers/inverters connected to the ac network in parallel;
   a first pulse width modulation (PWM) rectifier/inverter connected to the first network rectifier/inverter through a first dc link;
   a second PWM rectifier/inverter connected to the second network rectifier/inverter through a second dc link;
   a first two-layer stator winding having a plurality of stator coils connected to the first PWM rectifier/inverter; and a second two-layer stator winding having a plurality of stator coils connected to the second PWM rectifier/inverter;

wherein the stator coils of the first stator winding and the stator coils of the second stator winding are interconnected such that, in use, a vector sum of voltages across the stator coils in the first stator winding is substantially equal to a vector sum of voltages across the stator coils in the second stator winding; and wherein the stator coils of the first stator winding are interconnected according to the following formula:

the stator coil in pole N, slot X is connected to the stator coils in pole S, slot X+1, where N is the number of any North pole, where S is the number of the next South pole after pole N in a connection sequence, and where X is the connection sequence number of the first stator coil within a given set within the North pole.

2. The drive circuit for interfacing the electrical machine according to claim 1, wherein X has a value of 1, 3 or 5.

3. The drive circuit for interfacing the electrical machine according to claim 1, wherein the stator coils of the second stator winding are interconnected according to the following formula:

the stator coil in pole N, slot Y is connected to the stator coils in pole S, slot Y−1, where N is the number of any North pole, where S is the number of the next South pole after pole N in the connection sequence, and where Y is the connection sequence number of the first stator coil within a given set within the North pole.

4. The drive circuit for interfacing the electrical machine according to claim 3, wherein Y has a value of 2, 4 or 6.

5. The drive circuit for interfacing the electrical machine according to claim 1, wherein N is any odd integer number.

6. The drive circuit for interfacing the electrical machine according to claim 1, wherein S is any even integer number.

7. An electrical machine having a stator with a plurality of slots and a drive circuit for interfacing the electrical machine to an alternating current (ac) network, the drive circuit comprising:

first and second network rectifiers/inverters connected to the ac network in parallel;

a first pulse width modulation (PWM) rectifier/inverter connected to the first network rectifier/inverter through a first dc link;

a second PWM rectifier/inverter connected to the second network rectifier/inverter through a second dc link;

a first two-layer stator winding having a plurality of stator coils connected to the first PWM rectifier/inverter; and a second two-layer stator winding having a plurality of stator coils connected to the second PWM rectifier/inverter;

wherein the stator coils of the first stator winding and the stator coils of the second stator winding are interconnected such that, in use, a vector sum of voltages across the stator coils in the first stator winding is substantially equal to a vector sum of voltages across the stator coils in the second stator winding; and wherein the stator coils of the first stator winding are interconnected according to the following formula:

the stator coil in pole N, slot X is connected to the stator coils in series up to pole N, slot X+Q−1 that is then connected to the stator coils in pole S, slot X+Q, said stator coil is then connected to the stator coils in series up to pole S, slot X+2Q−1, where N is the number of any North pole, where S is the number of the next South pole after pole N in the connection sequence of the same parallel path, where Q is the number of the stator slots used per pole per phase, and where X is the connection sequence number of the first stator coil within a given set within the North pole.

8. The drive circuit for interfacing the electrical machine according to claim 7, wherein X has integer values of 1, 2Q+1 or 4Q+1.

9. The drive circuit for interfacing the electrical machine according to claim 7, wherein the stator coils of the second stator winding are interconnected according to the following formula:

the stator coil in pole N, slot Y is connected to the stator coils in series up to pole N, slot Y+Q−1 that is then connected to the stator coils in pole S, slot Y−Q, said stator coil is then connected to the stator coils in series up to pole S, slot Y−1, where N is the number of any North pole, where S is the number of the next South pole after pole N in the connection sequence of the same parallel path, where Q is the number of the stator slots used per pole per phase, and where Y is the connection sequence number of the first stator coil within a given set within the North pole.

10. The drive circuit for interfacing the electrical machine according to claim 9, wherein Y has integer values of Q+1, 3Q+1 or 5Q+1.

11. The drive circuit for interfacing the electrical machine according to claim 7, wherein N is any odd integer number.

12. The drive circuit for interfacing the electrical machine according to claim 7, wherein S is any even integer number.

13. The drive circuit for interfacing the electrical machine according to claim 7, wherein Q is any integer number.

14. An electrical machine having a stator with a plurality of slots and a drive circuit for interfacing the electrical machine to an alternating current (ac) network, the drive circuit comprising:

first and second network rectifiers/inverters connected to the ac network in parallel;

a first pulse width modulation (PWM) rectifier/inverter connected to the first network rectifier/inverter through a first dc link;

a second PWM rectifier/inverter connected to the second network rectifier/inverter through a second dc link;

a first two-layer stator winding having a plurality of stator coils connected to the first PWM rectifier/inverter;

a second two-layer stator winding having a plurality of stator coils connected to the second PWM rectifier/inverter;

the stator coils of the first stator winding and the stator coils of the second stator winding being in proximity to each other and susceptible to mutual coupling;

each adjacent pair of slots receiving at least one stator coil of the first stator winding and at least one stator coil of the second stator winding; and the stator coils of the first stator winding and the stator coils of the second stator winding being interconnected such that, in use, a vector sum of voltages across the stator coils in the first stator winding and a vector sum of voltage across the stator coils of the second stator winding are substantially equal and in phase, and the first and second PWM rectifiers/inverters providing substantially the same output voltages and substantially the same output PWM voltage waveforms, so as to reduce effects of the mutual coupling between the stator coils of the first and second stator windings and reduce PWM frequency current harmonics flowing in the first and second stator windings.

* * * * *